(12) United States Patent
Belew et al.

(10) Patent No.: US 6,644,869 B1
(45) Date of Patent: Nov. 11, 2003

(54) CONDUCTIVE SPLINT FOR FIBER OPTIC CABLES

(75) Inventors: Michael Shane Belew, Columbus, OH (US); Leon B. Dent, Brigham City, UT (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/245,667

(22) Filed: Sep. 17, 2002

(51) Int. Cl.[7] ............................................... H01R 6/255
(52) U.S. Cl. ......................................................... 385/95
(58) Field of Search .............................. 385/95, 97, 98, 385/100, 99, 136, 135, 58

(56) References Cited

U.S. PATENT DOCUMENTS

| | | | |
|---|---|---|---|
| 4,580,874 A | * | 4/1986 | Winter et al. ................. 385/99 |
| 4,822,131 A | * | 4/1989 | Anderton ..................... 385/58 |
| 5,005,940 A | * | 4/1991 | Modrey ........................ 385/55 |
| 5,661,842 A | | 8/1997 | Faust .......................... 385/139 |
| 5,747,742 A | | 5/1998 | Nelson ...................... 174/84 R |
| 5,903,973 A | | 5/1999 | Nelson ........................ 291/883 |
| 6,091,877 A | | 7/2000 | Eslambolchi et al. ........ 385/136 |
| 6,273,621 B1 | | 8/2001 | Eslambolchi et al. ......... 385/95 |
| 6,326,550 B1 | | 12/2001 | Dyer et al. ................... 174/93 |

* cited by examiner

Primary Examiner—Tulsidas Patel

(57) ABSTRACT

A conductive splint for repairing a damaged metallic sheath of a fiber optic cable includes a C-shaped stabilization element that spans the damaged area and a conductive stabilization component that attaches to the C-shaped stabilization element and provides for electrical connection across the section of damaged sheath. The conductive stabilization component includes a pair of end clamps that have an inner barbed surface for penetrating into and contacting the metallic sheath, and a conductive brace that is coupled between the clamps, the combination of the clamps and brace forming an electrical path across the damaged section. A heat shrink blanket is used to encapsulate the combination of the C-shaped element and conductive stabilization component, preventing further corrosion in the damaged section.

8 Claims, 2 Drawing Sheets

CONDUCTIVE SPLINT FOR FIBER OPTIC CABLES

TECHNICAL FIELD

The present invention relates to restoration and repair of fiber optic cables and, more particularly, to the provision of a conductive splint to restore the mechanical and electrical integrity of a metallic sheath surrounding a fiber optic cable.

BACKGROUND OF THE INVENTION

Fiber optic cable has become a standard transmission medium for many different communication systems. In general, a fiber optic cable consists of a number of separate optical fibers that are stranded together, and may include a central metallic strength member to provide support to the set of optical fibers. Surrounding the fibers is a metallic sheath, used to provide outer mechanical support to the cable, as well as to provide an electrical signal path that is used to send certain operational tones along the length of the cable. Plastic coatings may then be applied over the metallic sheath as a protective encapsulant, particularly well-suited for situations where the cable is to be buried underground.

A buried cable is vulnerable to many environmental hazards, such as lightning strikes and animal damage. A lightning strike may burn a hole through the metallic sheath, yet not immediately cause any harm to the encased optical fibers. Animal damage may be slow, eroding the integrity of the metallic sheath over a relatively long period of time. Regardless of the source of damage, the cable will eventually deteriorate and expose the bare fibers. As such, the fibers are then extremely vulnerable to any type of movement of the earth or the cable.

Repair of these damaged areas are normally done by either replacement of sections of the fiber cable, or if the damage is caught before much corrosion has started, the cable sheath can be cleaned and a new coating of moisture-preventing tape can be placed around the cable to prevent further damage. These techniques are extremely labor intensive, requiring several hours to administer. A need remains in the art, therefore, for a repair kit that will allow a technique to quickly apply a protective coating around the damaged area of a fiber optic cable, where the protective coating will function to stop the corrosion process and protect the fiber cable from future damage.

SUMMARY OF THE INVENTION

The need remaining in the prior art is addressed by the present invention, which relates to restoration and repair of fiber optic cables and, more particularly, to the provision of a conductive splint to restore the mechanical and electrical integrity of a metallic sheath surrounding a fiber optic cable.

In accordance with the present invention, a conductive splint comprises a C-shaped stability bar including a pair of end straps molded into a section of heat shrink material, and a continuity and stabilization device that is coupled across the end straps. The continuity and stabilization device comprises a conductive brace with a pair of clamps disposed at either end. The clamps mate with the end straps of the C-shaped bar, where the inside of each clamp includes a set of teeth that will penetrate through the poly coating of the cable and make physical contact with the metallic sheath on either side of the damaged area. The combination of the clamps and the conductive brace thus provide both an electrically conductive path and physical stability to the damaged area. The damaged area may then further be covered with protective vinyl tape, then sealed in the heat shrink material.

In a preferred embodiment, each clamp includes a plurality of screws on the outer surface thereof, such that as the screws are tightened down, the teeth on the inner surface will penetrate into the metallic sheath.

Various advantages and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
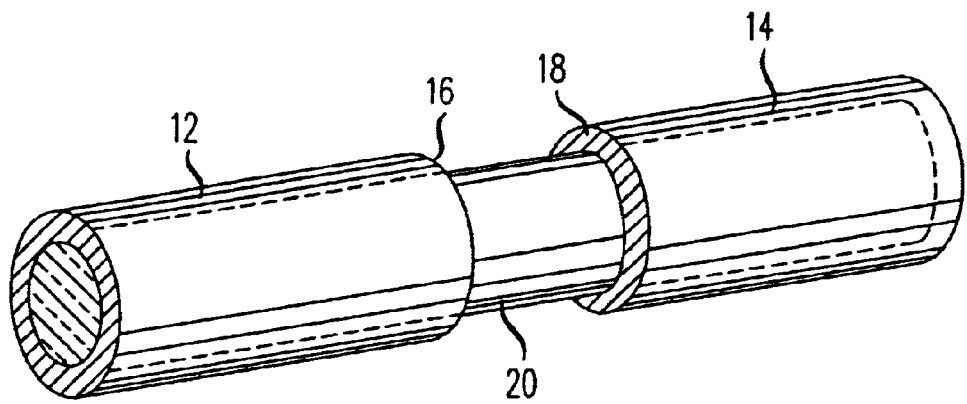
FIG. 1 illustrates an exemplary damaged fiber optic cable, with the metallic sheath removed in the damaged area.

FIG. 1 illustrates a portion of an exemplary fiber optic cable 10, where cable 10 has experienced damage to its outer metallic sheath. It is to be understood that the damage may have been a relatively small hole, corrosion or any other type of structural damage to the sheath. As shown, the sheath now comprises two sections, denoted 12 and 14, where sections 12 and 14 are both physically and electrically disconnected. That is, termination. 16 of section 12 is separated from termination 18 of section 14 by a predetermined amount. In order to repair such damage, cable 10 is first processed to remove all corrosion that may be present on the metallic sheath or, in the extreme, remove all of the metallic sheath material in the damaged area.

Figure 2:
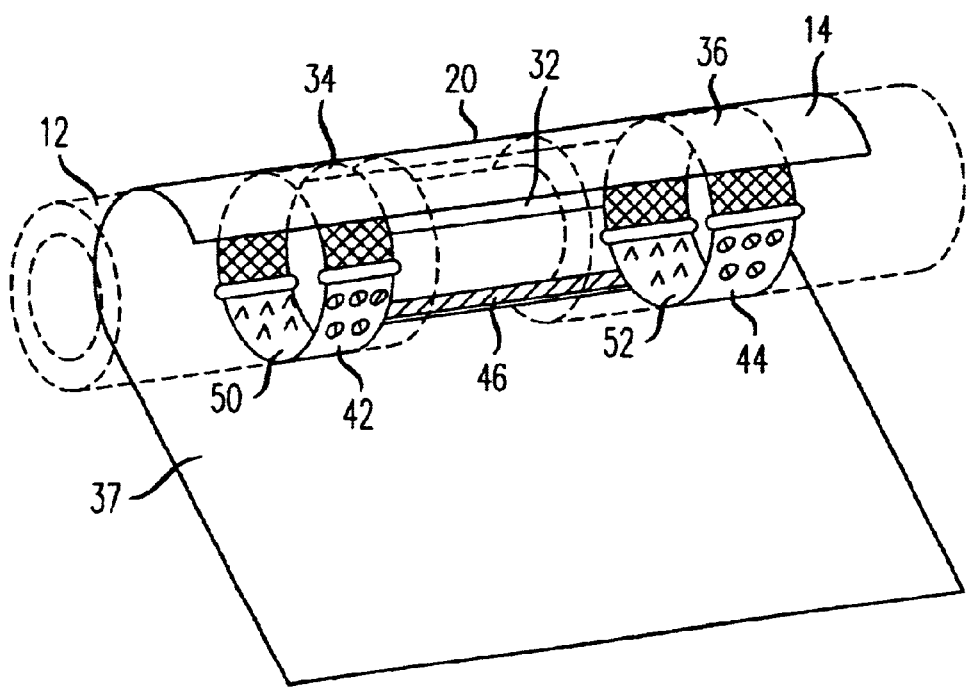
FIG. 2 is an isometric view of the conductive splint of the present invention surround the damaged fiber optic cable of FIG. 1.

Once the damaged area has been thoroughly cleaned, a conductive splint 30 formed in accordance with the present invention can be used to surround the damage, restore the physical and electrical integrity to the cable, and protect it from further damage. FIG. 2 illustrates conductive splint 30 as it is in place around cable 10. Conductive splint 30 comprises a C-shaped stability bar 32 including end straps 34 and 36, where straps 34 and 36 are molded into a length of heat shrink material 36. The dimensions of conductive splint 30 may vary, so as to be used with cables that have experienced greater and lesser degrees of damage to the sheath material. For example, heat shrink material 36 may be formed to a have total length of one foot (used to encapsulate relatively small damaged areas), or may exhibit a length of over four feet (used to encapsulate large damaged areas). C-shaped stability bar 32 may comprise stainless steel, although other materials may also be used. Conductive splint 30 further comprises a continuity and stabilization device 40 that is coupled to each end strap 34 and 36, and is used to restore an electrical connection around the damaged sheath area. Referring to FIG. 2, device 40 comprises a pair of end clamps 42 and 44, with a conductive brace 46 coupled between clamps 42 and 44. Each clamp is connected to a separate one of end straps 34 and 36, where in the arrangement of FIG. 2 clamp 42 is connected to end strap 34 and clamp 44 is connected to end strap 36. In one embodiment, clamps 42 and 44 comprise slots that mate with straps 34 and 36 to provide the connection.

Figure 3:
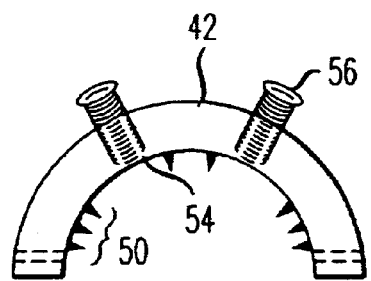
FIG. 3 is an end view of an exemplary clamp component of the conductive splint, illustrating in particular the location of the teeth used to penetrate the poly coating and contact the metallic sheath layer.
Figure 4:
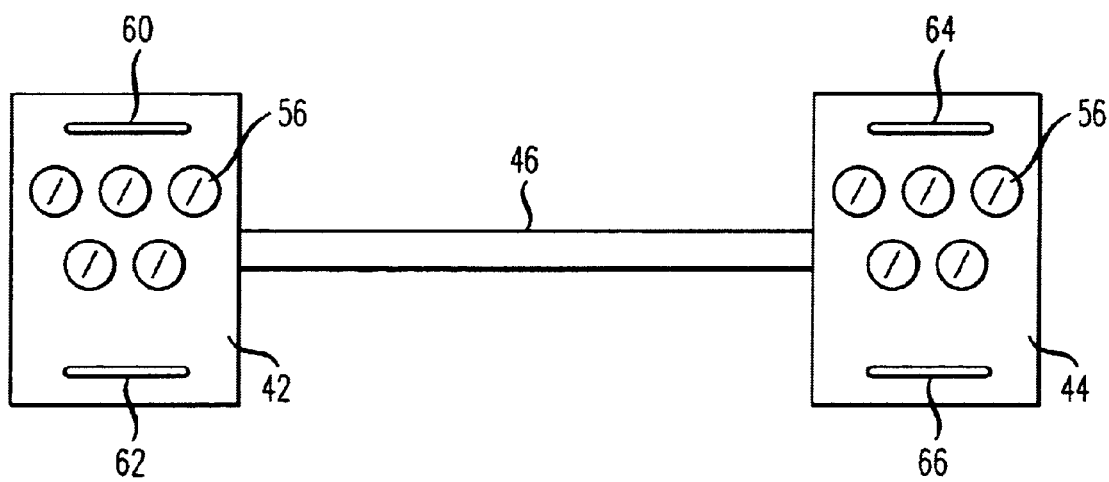
FIG. 4 contains a side view of the conductive brace and sheath-penetrating clamps.

In accordance with the present invention, electrical contact to metal sheath areas 12 and 14 on fiber cable 10 is provided by sheath penetration teeth included on each clamp 42 and 44. FIG. 2 illustrates one set of teeth 50 disposed on the inner surface of clamp 42 and another set of teeth 52 disposed on the inner surface of clamp 44. FIG. 3 contains an end view of clamp 42, clearly illustrating the presence and location of teeth 50 on the inner surface 54 of clamp 42. Also shown in the view of FIG. 3 is a set of exemplary set screws 56 that may be used to attach clamp 42 to fiber optic cable 10, where screws 56 are tightened so as to force teeth 50 through a poly outer coating (if any) on the cable and into contact with metallic sheath 16. FIG. 4 contains a side view of clamps 42 and 44, as well as conductive brace 46. Evident in the view of FIG. 4 is a pair of slots 60, 62 on clamp 42 (as well as slots 64, 66 on clamp 44) that are used to couple clamp 42 to strap 34.

Once conductive splint 30 is in place around fiber 10, a protective coating of vinyl tape may be applied to cover the damaged area and prevent the intrusion of debris into any region where the individual fibers may be exposed. Subsequent to the taping, heat shrink material 37 is wrapped around fiber 10 to completely encapsulate conductive splint 30 so as to securely hold all of the components together and prevent intrusion of water or other material into the repaired area, thus preventing further corrosion.

It is to be understood that the particular arrangement of the present invention as described is exemplary only and merely illustrative of the principles of the present invention; various modifications could be made by those skilled in the art without departing from the spirit and scope of the present invention, which is limited only by the claims that follow.

What is claimed is:

1. A conductive splint for repairing damage to a metallic sheath surrounding a fiber optic cable, the conductive splint comprising a stability bar including end straps disposed at the opposing terminations thereof;

a heat shrink blanket disposed to surround said stability bar such that the end straps are attached to said blanket;

a stabilization arrangement including a pair of conductive clamps with a conductive brace disposed therebetween, said clamps including sheath penetrating teeth for making contact with metallic sheath material on either side of a damaged section of metallic sheath, said stabilization arrangement coupled to the end straps of said stability bar such that the combination surrounds a section of damaged fiber optic cable, with said heat shrink blanket sized to completely encircle said damaged section of fiber optic cable.

2. A conductive splint as defined in claim 1 wherein the stability bar comprises a stainless steel material.

3. A conductive splint as defined in claim 1 wherein the stability bar end straps are molded into the heat shrink blanket.

4. A conductive splint as defined in claim 1 wherein each stabilization device clamp includes a pair of slots for mating with the stabilization bar end straps.

5. A conductive splint as defined in claim 1 wherein each clamp further comprises a plurality of set screws for tightening the clamp against the fiber optic cable and forcing the teeth to contact the metallic sheath material.

6. A conductive splint as defined in claim 1 wherein the stabilization bar is C-shaped.

7. A method of repairing a damaged section of metallic sheath on a fiber optic cable, the method comprising the steps of:

a) removing visible corrosion and debris from the damaged section of metallic sheath;

b) disposing a C-shaped longitudinal stability bar along the damaged section;

c) attaching a conductive stability device to said C-shaped stability bar, said stability device including a pair of clamps at opposing ends of a conductive brace, said clamps comprise sheath-penetrating teeth disposed on the inner surface thereof;

d) tightening said clamps until the teeth make physical and electrical contact with the underlying metallic sheath; and e) enclosing the tightened arrangement of step d) with heat shrink material.

8. The method as defined in claim 7 wherein prior to performing step e), a section of protective tape is disposed over the damaged metallic sheath section.

* * * * *